July 1, 1969  TAKEO YAMAMOTO ET AL  3,453,373

HIGH VOLTAGE ELECTRIC POWER CABLES

Filed May 3, 1967

NATURAL FIBERS — MICA SCALES

INVENTORS
Takeo Yamamoto
Minoru Yamamoto
BY
George B. ...
Attorney

United States Patent Office 3,453,373
Patented July 1, 1969

3,453,373
HIGH VOLTAGE ELECTRIC POWER CABLES
Takeo Yamamoto, Tokyo, and Minoru Yamamoto, Urawa-shi, Japan, assignors to The Fujikura Cable Works, Ltd., Tokyo, Japan, a corporation of Japan
Filed May 3, 1967, Ser. No. 635,835
Claims priority, application Japan, May 7, 1966, 41/28,726; May 10, 1966, 41/43,012; Sept. 6, 1966, 41/59,070; Jan. 17, 1967, 42/3,533
Int. Cl. H01b 7/02; B32b 19/02; D21d 3/00
U.S. Cl. 174—25          3 Claims

ABSTRACT OF THE DISCLOSURE

A high voltage multilayer power cable comprising a stranded conductor wire, a semiconductive layer arranged on the conductor wire, an insulating layer surrounding the semiconductive layer and consisting of paper loaded with mica, and a protective covering outermost layer.

Background of the invention

This invention relates to electric cables used in the transmission of electric power with super high voltage, more particularly to power cables having an insulating layer with improved dielectric loss and dielectric strength.

A conventional power cable has a conductor, consisting of a plurality of fine conducting wires stranded together, a thin semiconductive layer wrapped helically on said conductor, a thick insulation layer surrounding said semiconductive layer, a shielding layer covering said insulation layer and an outer sheath arranged on the shielding layer. The insulation layer generally has multilayers of paper mainly consisting of natural fiber pulps such as wood pulp or bast fiber pulp, having a density of about 0.8 to 0.85 g./cm.$^3$ and impregnated with insulating oil. The electric properties of the cable primarily depend on the insulation layer.

The major electric properties required for the insulation layer are that it has high dielectric strength and small dielectric loss. The oil impregnated insulation paper in common use almost fully meets requirements concerning such electric properties in the case of a relatively low voltage, and the insulation prepared by winding said paper can be further improved in electric properties by using highly compressed insulating fluids such as insulating oil or inert gas.

However, recent increasing demands for electric power have resulted in elevated transmission voltages and consequently it is necessary for cable insulations to have higher electric insulation properties sufficient to meet these requirements.

Summary of the invention

The present invention provides a power cable containing a dielectric formed from paper loaded with very fine mica scales. Concretely, said mica scales are included, for example, in paper, said paper constituting a dielectric when it is wound around the cable conductor. The power cable of this invention containing such a dielectric has higher dielectric strength and lower dielectric loss than the conventional power cable having a dielectric formed from paper without mica scales, and consequently displays stable electric properties over a long period.

It is therefore an object of the present invention to provide a power cable containing insulating layers having high dielectric strength and low dielectric loss.

Another object of this invention is to provide a high reliability and long life power cable wherein the dielectrics is less subject to damage due to corona or streamer discharges occurring therein.

A further object of this invention is to provide a novel and useful power cable which is applicable to the transmission of electric power with super high voltage.

A further object of this invention is to provide a dielectric which has improved electric properties, namely, a dielectric constant and dielectric power factor.

Description of the preferred embodiments

Figure 1:
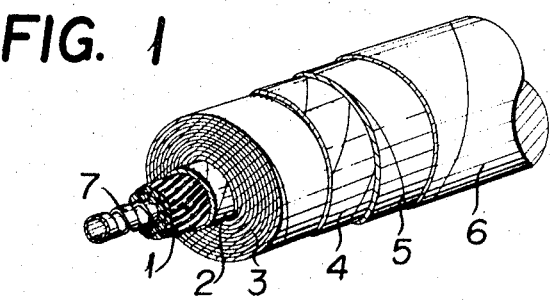
FIG. 1 is a perspective view of a power cable embodying this invention.

Referring now to the accompanying drawing, more particularly FIG. 1, a power cable according to this invention comprises a stranded conductor 1, a semiconductive layer 2 disposed on said conductor, an insulating layer 3 surrounding said semiconductive layer, an outer semiconductive layer 4 coveringg said insulating layer, a shielding layer 5 wrapped around said outer semiconductive layer, and a protective covering 6 positioned outermost. The conductor 1 has a helically wound metal strip 7 in the central portion thereof to form an elongated cylindrical spacing for filling with an insulating fluid. The insulating layer 3 is prepared by winding multilayers of paper loading mica and is filled with an inert gas or insulating oil for improving dielectrc properties of the insulating layer.

The power cable of this invention has an extremely high dielectric strength and other considerably improved dielectric properties.

The mica loaded with paper increases the impermeability of the dielectric to electricity and, where the dielectric is exposed to a strong electric field, has the effect of presenting partial discharge or so-called streamers from being emitted because of an electron avalanche occurring within the dielectric, thus imparting high breakdown strength to the dielectric.

The types of mica applicable to the present invention which are in a state of being used with paper comprise aluminosilicates containing alkali metals of the mica group such as muscovite, paragonite, lepidolite, biotite, lepidemelane and zinnwaldite. Such mica may be used alone or in a mixture of two or more. The mica should preferably be roasted at temperatures of about 750° C. or higher to remove part of the crystallization water and also subjected to proper treatment to remove impurities. The mica thus treated is further cleaved and beaten so as to obtain very fine scales (for example, 0.1 to 1 micron thick and 1.5 mm.$^2$ or less in size). One of the effective cleaving methods comprises immersing the mica in concentrated sulfuric acid to permit the acid to penetrate into the cleavage plane of the mica, and then immersing the workpiece in a body of water to produce heat by contact with the water of the concentrated sulfuric acid lying on the cleavage plane, thereby carrying out the cleavage of the mica.

In a preferred form of this invention, mica scales are included in the paper by dispersing them in water together with pulp, the raw material for paper, and subjecting them to the papermaking process according to the ordinary papermaking method. The mica scales thus held in the structure of the paper improve the dielectric properties of a dielectric element as in the preceding case. Also, greater proportions of mica scales in the paper result in a greater hardness for the insulating paper, as well as provide a certain advantage to the insulation formed by winding said paper. This advantage lies in minimizing the tendency of that part of a dielectric lying on the conductor to prevent buckling, thus preventing reduction in dielectric strength due to buckling. However, the inclusion of mica scales within the paper structure unavoidably decreases the tensile strength and elongation of insulation paper thus prepared. For instance, kraft paper 0.007 mm. thick containing mica scales presented the following variations in tensile strength and elongation according to the proportions of mica scales included:

|  | Mixing ratio of mica scales (percent) | | | | |
| --- | --- | --- | --- | --- | --- |
|  | 0 | 10 | 20 | 30 | 50 |
| Tensile strength (kg./mm.$^2$) | 11.4 | 11.4 | 11.4 | 10.9 | 9.05 |
| Elongation (percent) | 2.8 | 2.6 | 2.6 | 1.8 | 1.3 |

Figure 2:
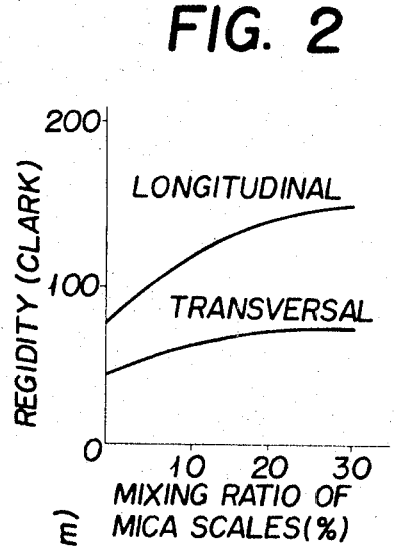
FIG. 2 is a curve showing variations in hardness of paper corresponding to the proportions of mica scales contained in insulating paper.

As seen from the above results, the elongation of insulating paper sharply drops when the proportions of mica scales included exceed 20 percent. In FIG. 2 are represented variations in paper hardness in this case. It will be understood that the terms of direction are given as the direction in which paper is prepared. Where thin insulating paper prepared by inclusion of relatively high proportions of mica scales with the resultant low elongation is wound in the immediate proximity of a cable conductor in order to constitute an insulating layer, there will occur during the manufacture of cables the danger of a dielectric being cut or presenting cracks in the lengthwise direction. Therefore, for thin insulating paper accompanied with such inconveniences, 20 percent would be the upper limit for the inclusion of mica scales therein.

Figure 3:
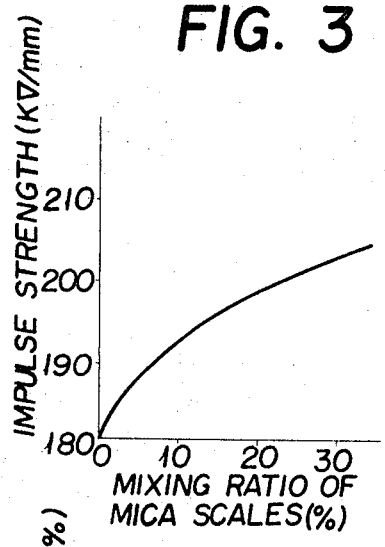
FIG. 3 is a curve showing variation in impulse strength corresponding to the proportions of mica scales contained in insulating paper.
Figure 4:
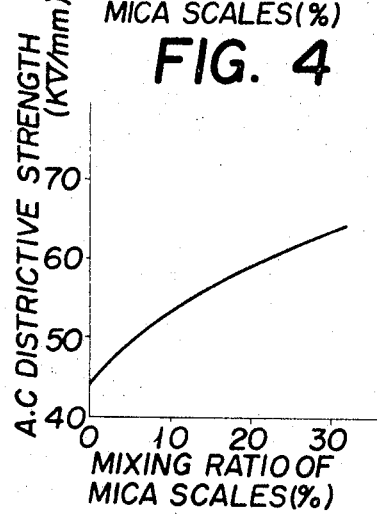
FIG. 4 is a curve showing variations in AC dielectric strength corresponding to the proportions of mica scales contained in insulating paper.
Figure 5:
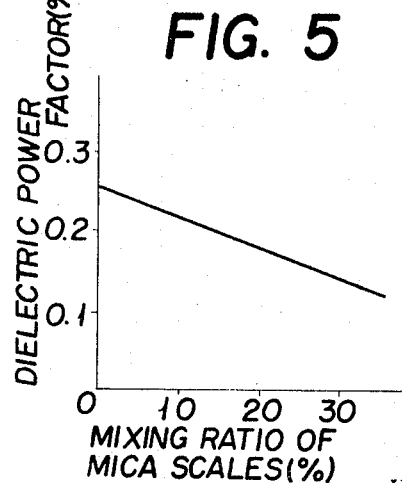
FIG. 5 is a curve showing variations in dielectric power factor corresponding to the proportions of mica scales contained in insulating paper.
Figure 1A:
FIG. 1a is a longitudinal side view of the inside of a mixed paper, tape contemplated herein.

As previously mentioned, higher proportions of mica included in the insulating paper improve the electric properties of the dielectric prepared from said paper. FIGS. 3, 4 and 5, respectively, indicate variations in impulse strength corresponding to the mixing ratio of mica, and those in AC breakdown strength and dielectric constant under the same conditions. These graphs clearly show that the greater proportions of mica mixed, the greater advantage will be gained in improving the electric properties of a dielectric. Therefore, although too high proportions of mica may cause the aforesaid inconveniences, 20 percent or higher should be preferable if a dielectric is to be produced with better electric properties.

To meet the aforesaid requirements, it is necessary to minimize by means of adequate reinforcing material the degradation of mechanical strength of thin insulating paper which might arise if it contained large proportions of mica. One of the reinforcing means is to attach another sheet of appropriate insulating paper having good dielectric properties and tensile strength to at least one surface of the paper loaded with mica. Such reinforced paper may be attached to said paper by an adhesive material, or may be joined together with a thin web of natural or synthetic fiber pulp before the paper loaded with mica is dried. Measurement was made of the mechanical and electric properties of the dielectrics thus reinforced and those of unreinforced kraft paper and mica-carrying paper, obtaining the results given below:

|  | Kraft paper | Paper containing 30% mica scales | Paper containing 50% mica scales joined with pulp |
| --- | --- | --- | --- |
| Thickness (micron) | 70 | 70 | 70 |
| Density (g./cm.$^3$) | 0.80 | 0.86 | 0.84 |
| Tensile strength (kg./15 mm. width) | 10.5 | 10.3 | 10.5 |
| Elongation (percent) | 1.6 | 1.0 | 1.5 |
| Flexural strength in drying (schopper folding endurance) | 20 | 9 | 19 |
| Dielectric constant | 3.53 | 3.32 | 3.34 |
| Dielectric strength (percent/80° C.) | 0.204 | 0.165 | 0.169 |
| Impulse strength (kv./mm.) | 118 | 139 | 138 |

The paper containing mica scales may also be reinforced by the bonding of its constituent fiber and mica scales due to the melting and solidification of thermoplastic synthetic resin. One of the methods to carry out such reinforcement is to disperse pulp, mica scales and synthetic resin fibers or powders together in water, form into a web as described above, dehydration and drying, melt and cool the synthetic resin contained in the web. Alternatively, the thermoplastic resin fibers or powders may be placed on the surface of a web containing mica scale prepared in advance and heated, melted and then cooled for solidification. When the synthetic resin is melted, a plurality of webs loaded with mica may be put one upon another and pressed together with heat under appropriate pressure.

The dielectric containing mica thus reinforced can be wound about a cable conductor without difficulties by the same procedure as is used with ordinary insulation paper so as to form an insulating layer.

It should be understood that this invention also includes a power cable having an insulation in which is used paper loaded with mica in only a part thereof. Generally speaking, the power cable insulation is subject to greater electric field stresses particularly on the inside of the insulating layer close to the conductor, thus the inside sections being more susceptible to damage due to the generation of corona discharges. Therefore, it is advisable to use a dielectric prepared from paper loaded with mica having high dielectric strength on the inside and/or outside of the insulating layer, the remaining parts thereof being permissibly formed from an ordinary dielectric such, for example, as kraft insulating paper or synthetic resin tape. Even in this case, the insulation as a whole can be considerably improved in dielectric properties as compared with one prepared from ordinary insulating paper alone.

Further according to the present invention, an oil-impregnated insulation heated and dried under vacuum for use in a power cable is again filled with insulating fluids such, for example, as insulating oil or inert gas under great pressure in order to improve the dielectric properties.

While the invention has been described in connection with some preferred embodiments thereof, the invention is not limited thereto and includes any modifications and alterations which fall within the true spirit and scope of the invention as defined in the appended claims.

What is claimed is:

1. A power cable comprising a conductor, an insulation wrapping said conductor, said insulation having a dielectric consisting at least in part of a plurality of mixed paper tapes of pulp and mica scales and is impregnated with an insulating oil, a covering to protect said insulation and an insulation fluid retained by said covering under pressure.

2. A power cable claimed in claim 1 wherein said mixed paper tape contains said mica scales in the amount of not more than 20 percent by weight based on the total weight of said tape.

3. A power cable claimed in claim 1 or 2 wherein said mica scales are in the form of fine particles having a thickness of from 0.1 to 1 micron and a size of less than 1.5 mm.²

References Cited

UNITED STATES PATENTS

| 2,772,696 | 12/1956 | Schneider et al. | 138—137 X |
| 3,101,845 | 8/1963 | Heasley | 174—110 |
| 3,105,872 | 10/1963 | Thompson et al. | 174—25 |
| 3,168,434 | 2/1965 | Heyman. | |

FOREIGN PATENTS

| 570,972 | 9/1958 | Belgium. |
| 693,821 | 9/1964 | Canada. |

LEWIS H. MYERS, *Primary Examiner.*

A. T. GRIMLEY, *Assistant Examiner.*

U.S. Cl. X.R.

161—171, 163; 162—106, 145; 174—110, 120, 121